(12) United States Patent
Hashimoto et al.

(10) Patent No.: US 7,022,388 B2
(45) Date of Patent: Apr. 4, 2006

(54) LAMINATED POLYESTER FILM AND LAMINATED FILM

(75) Inventors: Katsuyuki Hashimoto, Gifu (JP); Makoto Handa, Gifu (JP); Shinji Yano, Gifu (JP); Koji Kubo, Gifu (JP)

(73) Assignee: Teijin DuPont Films Japan Limited, Tokyo (JP)

( * ) Notice: Subject to any disclaimer, the term of this patent is extended or adjusted under 35 U.S.C. 154(b) by 0 days.

(21) Appl. No.: 10/491,921

(22) PCT Filed: Jun. 2, 2003

(86) PCT No.: PCT/JP03/06931

§ 371 (c)(1),
(2), (4) Date: Apr. 8, 2004

(87) PCT Pub. No.: WO03/102057

PCT Pub. Date: Dec. 11, 2003

(65) Prior Publication Data

US 2004/0265539 A1    Dec. 30, 2004

(30) Foreign Application Priority Data

Jun. 4, 2002    (JP)    .............................. 2002-162763

(51) Int. Cl.
B32B 7/02    (2006.01)
B32B 27/08    (2006.01)
B32B 27/18    (2006.01)
B32B 27/30    (2006.01)
B32B 27/36    (2006.01)

(52) U.S. Cl. .................... 428/34.9; 428/36.6; 428/36.7; 428/141; 428/212; 428/458; 428/469; 428/480; 483/910; 483/694 SG (58) Field of Classification Search .................... None
See application file for complete search history.

(56) References Cited

U.S. PATENT DOCUMENTS

| | | | |
|---|---|---|---|
| 4,526,847 A * | 7/1985 | Walker et al. ................. 430/18 |
| 5,648,159 A * | 7/1997 | Sato ........................... 428/327 |
| 5,880,201 A * | 3/1999 | Enomoto et al. ........... 524/492 |
| 5,908,688 A * | 6/1999 | Okada et al. ................ 428/216 |
| 5,911,899 A * | 6/1999 | Yoshikai et al. ............. 219/522 |
| 6,083,617 A * | 7/2000 | Aoyama et al. ............. 428/327 |
| 6,303,228 B1 * | 10/2001 | Watanabe et al. ........ 428/423.7 |
| 6,316,096 B1 * | 11/2001 | Yoshida et al. .............. 428/331 |
| 6,319,587 B1 * | 11/2001 | Okazaki et al. ............. 428/141 |
| 6,331,344 B1 * | 12/2001 | Okazaki et al. ............. 428/141 |

(Continued)

FOREIGN PATENT DOCUMENTS

EP    0728801 A2    8/1996

(Continued)

Primary Examiner—Vivian Chen
(74) Attorney, Agent, or Firm—Sughrue Mion, PLLC (57) ABSTRACT

There is provided a laminated polyester film which is improved in lubricity, transparency, dimensional stability, shock resistance and adhesion, and which comprises a polyester base film comprising polyester and to at least one direction, and a coating layer provided on at least one surface of the base film, wherein said coating layer contains polymer binder and inert particles, the refractive index of the inert particles being substantially same as that of the polymer binder, and wherein the laminated polyester film has a haze of 1.5% or less, a total light transmittance of 85% or more, 50% destructing energy per 100 μm film thickness of 0.3 J or more, and a thermal shrinkage at 230° C. for 30 minutes of 4% or less.

19 Claims, 1 Drawing Sheet

U.S. PATENT DOCUMENTS

| | | | |
|---|---|---|---|
| 6,348,267 B1 * | 2/2002 | Okajima | 428/423.7 |
| 6,365,659 B1 * | 4/2002 | Aoyama et al. | 524/399 |
| 6,383,729 B1 * | 5/2002 | Ohnuma et al. | 430/533 |
| 6,403,224 B1 * | 6/2002 | Okajima et al. | 428/423.7 |
| 6,562,274 B1 * | 5/2003 | Asakura et al. | 264/290.2 |
| 6,761,968 B1 * | 7/2004 | Kusume et al. | 428/328 |
| 6,773,802 B1 * | 8/2004 | Kobayashi et al. | 428/323 |
| 6,853,013 B1 * | 2/2005 | Hirai et al. | 257/103 |
| 2002/0022156 A1 * | 2/2002 | Bright | 428/698 |
| 2003/0180562 A1 * | 9/2003 | Kobayashi et al. | 428/482 |
| 2004/0028925 A1 * | 2/2004 | Kusume et al. | 428/480 |

FOREIGN PATENT DOCUMENTS

| | | |
|---|---|---|
| EP | 1178075 A1 | 2/2002 |
| EP | 1293532 A1 | 3/2003 |
| JP | 2000-007799 * | 1/2000 |
| JP | 2001-232739 A | 8/2001 |
| WO | WO 0109451 A1 | 2/2001 |
| WO | WO 01/96451 A1 | 12/2001 |

* cited by examiner

Fig. 1

LAMINATED POLYESTER FILM AND LAMINATED FILM

TECHNICAL FIELD

The present invention relates to a laminated polyester film comprising a polyester base film stretched to at least one direction and a coated layer provided on at least one surface of the base film, and to a laminated film using the laminated polyester film.

BACKGROUND ART

A polyester film has excellent mechanical properties, heat resistance and chemical resistance. Therefore, it has been used for magnetic tapes, strongly magnetic thin tapes, photographic films, packing films, films for electronic parts, electrical insulating films, films for metal laminate, and films for protecting various members. In recent years, the polyester film has been used for display surfaces of image display devices. For the display surfaces of image display devices such as liquid crystal display devices, glass substrates have been used. However, the use of the polyester film has been investigated in view of the recent trends of reducing the size, light-weighting, and enlarging the screens, of the image displaying devices.

DISCLOSURE OF THE INVENTION

It has been extremely difficult to obtain a polymer film which has sufficient shock resistance, transparency and lubricity, and which is improved in the adhesion to a hard coat layer and to an adhesive layer. To the polymer film used for the display surface of an image display device, functional layers such as a gas barrier layer, conductor layer, semiconductor layer and luminescence layer are laminated depending on applications. These functional layers are laminated by methods such as vacuum evaporations ion-plating, sputtering and plasma CVD and, therefore, the polymer film is exposed to a relatively high temperature during the laminating steps. Accordingly, the resulted laminate may not exhibit expected functions because the laminate may be cracked, crinkled or broken during the time or after the time the functional layer is laminated to the polymer film.

Therefore, the purpose of the present invention is to provide a laminated polyester film which is free from the prior art problems, which has sufficient shock resistance, transparency and lubricity, and which is improved in the adhesion to a hard coat layer and to an adhesive layer.

According to the present invention, the purpose is achieved by a laminated polyester film comprising a polyester base film stretched to at least one direction and a coating layer provided on at least one surface of the base film, characterized in that the coating layer contains polymer binder and inert particles, that the refractive index of the inert particles is substantially same as that of the polymer binder, and that the laminated polyester film has a haze of 1.5% or less, a total light transmittance of 85% or higher, a 50% destruction energy per 100 μm film thickness of 0.3 J or higher, and a thermal shrinkage ratio at 230° C. for 30 minutes of 4% or less.

The present invention is explained in detail.

<Base Film>

According to the present invention, the polyester constituting the base film is a linear saturated polyester formed from an aromatic dibasic acid or its ester forming derivative and diol or its ester forming derivative. Examples of such a polyester include polyethylene terephthalate, polyethylene isophthalate, polybutylene terephthalate, poly (1,4-cyclohexylene dimethylene terephthalate), polyethylene-2,6-naphthalene dicarboxylate. From among these polyesters, polyethylene terephthalate and polyethylene-2,6-naphthalene dicarboxylate are preferable from the points of their dynamical properties and optical properties. From among them, polyethylene-2,6-naphthalene dicarboxylate is preferable because of its high mechanical strength, small thermal shrinkage, and low production of oligomers at heating.

The polyester may be a homopolymer or a copolymer. When the copolymer is adopted, the copolymerizing acid component constituting the copolymer may be aromatic dicarboxylic acids such as phthalic acid, 2,6-naphthalene dicarboxylic acid; aliphatic dicarboxylic acids such as adipic acid, azelaic acid, sebacic acid, and 1,10-decane dicarboxylic acid. Examples of the diol component include aliphatic diols such as 1,4-butane diol, 1,6-hexane diol and neopentyl glycol; and alicyclic diols such as 1,4-cyclohexane dimethanol. These compounds may be used either singly or in the form of a mixture of two or more compounds.

The polyester may be those of which a part or whole of terminal hydroxyl groups and/or carboxyl groups are blocked by a monofunctional compound such as benzoic acid and methoxypolyalkylene glycol. Further, it may be a copolymerized product in the range where substantially linear polymer can be obtained, with a very small amount of tri- or high-functional ester forming compounds, such as glycerin and pentaerythritol.

According to the invention, one of the preferred polyesters for the base films is isophthalic acid copolymerized polyethylene terephthalate. The isophthalic acid copolymerized polyethylene terephthalate comprises preferably 90 mol % or higher, more preferably 95 mol % or higher, of terephthalic acid, based on the total dicarboxylic acid components, and 10 mol % or less, more preferably 5 mol % or less, of isophthalic acid, based on the total dicarboxylic acid components.

According to the invention, one of the preferred polyesters for the base films is polyethylene naphthalene carboxylate, and more preferably polyethylene-2,6-naphthalene carboxylate. The polyethylene-2,6-naphthalene carboxylate comprises preferably 90 mol % or higher, more preferably 95 mol % or higher, and still more preferably 97% or higher, of the 2,6-naphthalene dicarboxylic acid component, based on the total dicarboxylic acid components.

The polyester of the invention can be obtained by known processes. For example, polyester of a relatively low polymerization degree can be obtained directly by a reaction of dicarboxylic acid with diol. Further, the polyester can be obtained by carrying out an ester exchange of a low alkyl ester of dicarboxylic acid with diol in the presence of ester exchange catalysts and a polymerization reaction in the presence of polycondensation catalysts. Examples of the ester exchange catalysts include compounds of sodium, potassium, magnesium, calcium, zinc, strontium, titanium, zirconium, manganese and cobalt. Examples of the polycondensation catalysts include antimony compounds such as antimony trioxide and antimony pentaoxide; germanium compounds represented by germanium dioxide; and titanium compounds such as tetraethyl titanate, tetrapropyl titanate, tetraphenyl titanate or their partial hydrolyzates, titanyl ammonium oxalate, titanyl potassium oxalate and titanium trisacetyl acetonate. When the polycondensation reaction is carried out via the ester exchange reaction, the ester exchange catalysts are deactivated preferably before the polycondensation reaction starts. The deactivation may be done by adding phosphorus compounds such as trimethyl phosphate, triethyl phosphate, tris-n-butyl phosphate and ortho-phosphoric acid to the polyester in an amount of 20 to 100 ppm in terms of a phosphorus element. The polyester may be polymerized in a solid-phase. In this instance, the polyester obtained by ablation polymerization is chipped, followed by solid-phase polymerization under heat at a reduced pressure or under an inactive stream of nitrogen, etc.

The intrinsic viscosity of the polyester is preferably 0.40 dl/g or higher, and more preferably 0.40 to 0.90 dl/g. When the intrinsic viscosity is less than 0.40 dl/g, there may occur frequently an interruption of steps, which is not preferable. When the intrinsic viscosity is greater than 0.9 dl/g, it becomes difficult to melt and extrude the polyester due to high melting viscosity. Further, the polymerization time is prolonged, which is not economical and is not preferable. The polyester may contain colorants, anti-static agents, oxidation inhibitors and/or organic lubricants.

<Coating Layer>

The laminated polyester film of the invention comprises a base film and a coating layer provided on at least one surface of the base film. The coating layer contains polymer binder and inert particles. The refractive index of the inert particles is substantially same as that of the polymer binder, meaning that the difference in the refractive index between the inert particles and the polymer binder is 0.04 or less. The difference in the refractive index is preferably 0.02 or less, more preferably 0.01 or less, and still more preferably 0.005 or less. When it is greater than 0.04, light scatters greatly due to the difference in the refractive index at the border between the polymer binder and the inert particles, resulting in raising the haze value of the coating layer and degrading transparency.

<Polymer Binder>

The polymer binder comprises preferably a mixture of a polyester resin with an acrylic resin which contains oxazoline groups and polyalkylene oxide chains, from the point of producing excellent adhesion. The polymer binder is preferably water soluble or water dispersible, but a binder which is soluble in water containing a certain amount of an organic solvent can be also used. The polymer binder of the coating film has a refractive index in the range normally between 1.50 and 1.60.

<Polyester Resin>

A polyester obtained from polybasic acid components and diol components, selected from those shown below, can be used as the polyester resin constituting the polymer binder. Examples of the polybasic components include terephthalic acid, isophthalic acid, phthalic acid, phthalic anhydride, 2,6-naphthalene dicarboxylic acid, 1,4-cyclohexane dicarboxylic acid, adipic acid, xxxx. A preferred polyester resin constituting the polymer binder is copolymerized polyester using two or more dicarboxylic acids component. The polyester resin may contain unsaturated polybasic components such as maleic acid and itaconic acid, and hydroxy carboxylic acid components such as p-hydroxy benzoic acid, if their amount is not too great.

Examples of the diol components for the polyester resin include ethylene glycol, 1,4-butanediol, diethylene glycol, dipropylene glycol, 1,6-hexanediol, 1,4-cyclohexane dimethanol, xylene glycol, dimethylol propane, poly(ethylene oxide) glycol, and poly(tetramethylene oxide) glycol.

The glass transition point of the polyester resin of the polymer binder is preferably 40 to 100° C., and more preferably 60 to 80° C. The film obtained from the polyester resin of the above range shows excellent adhesion and flaw resistance. When the glass transition point is less than 40° C., a blocking action likely occurs between films, while when the point is over 100° C., the coating film is hardened to become brittle, degrading flaw resistance, which is not preferable.

<Acrylic Resin>

The acrylic resin, which may be used as the constituting component of the polymer binder and which has oxazoline groups and polyalkylene oxide chains, may be the one which uses the following monomer having the oxazoline groups below and the monomer having the polyalkylene oxide chains below.

Examples of the monomer having the oxazoline groups include 2-vinyl-2-oxazoline, 2-vinyl-4-methyl-2-oxazoline, 2-vinyl-5-methyl-2-oxazoline, 2-isopropenyl-2-oxazoline, 2-isopropenyl-4-methyl-2-oxazoline, and 2-isopropenyl-5-methyl-2-oxazoline. These compounds may be used either singly or in a form of a mixture. Among them, 2-isopropenyl-2-oxazoline is easily available in trade and is suitably used. By using the acrylic resin having oxazoline groups, the cohesive strength of the coating layer is improved whereby the adhesion to a hard coat, adhesive layer, etc., is strengthened. Further, the use of the acrylic resin having oxazoline groups gives frictional resistance to the film processed by a metallic roll used at the film-producing step, and at the hard coat processing step.

Examples of the monomer having polyalkylene oxide chains may be those in which polyalkylene oxide is added to the ester part of an acrylic acid or methacrylic acid. Examples of the polyalkylene oxide chains include polymethylene oxide, polyethylene oxide, polypropylene oxide and polybutylene oxide. The repeating unit of the polyalkylene oxide chain is preferably 3 to 100. By using the acrylic resin which has polyalkylene oxide chains, the compatibility between the polyester resin and the acrylic resin of the polymer binder in the coating layer is improved in comparison with the case where an acrylic resin containing no polyalkylene oxide chain is used and, accordingly, the transparency of the coating layer can be improved. When the repeating unit of the polyalkylene oxide chain is less than 3, the compatibility between the polyester resin and the acrylic resin is reduced, causing degradation in the transparency of the coating layer, while when the repeating unit is greater than 100, the resistance to moisture and to heat of the coating layer is reduced, resulting in decreasing the adhesion to the hard coat, etc., in high moisture and high temperature conditions.

Other monomers, shown below, may be copolymerized with the acrylic resin. Examples of the copolymerizable monomers include alkylacrylate and alkylmethacrylate (the alkyl group may be, for example, methyl, ethyl, n-propyl, isopropyl, n-butyl, isobutyl, t-butyl, 2-ethylhexyl, cyclohexyl, etc.); hydroxy-containing monomers such as 2-hydroxyethyl acrylate, 2-hydroxyethyl methacrylate, 2-hydroxypropylacrylate and 2-hydroxypropylmethacrylate; epoxy group-containing monomers such as glycidyl acrylate, glycidyl methacrylate, and allylglycidyl ether; monomers containing carboxyl groups of, for example, acrylic acid, methacrylic acid, itaconic acid, maleic acid, fumaric acid, crotonic acid, styrene sulfonic acid and their salts (sodium salts, potassium salts, ammonium salts, tertiary amine salts, etc.); monomers having amide groups such as acrylamide, methacrylamide, N-alkylacryl amide, N-alkylmethacryl amide, N,N-dialkylacrylamide, N,N-dialkylmethacrylate (the alkyl group may be, for example, methyl, ethyl, n-propyl, isopropyl, n-butyl, isobutyl, t-butyl, 2-ethylhexyl, cyclohexyl, etc.), N-alkoxyacryl amide, N-alkoxymethacryl amide, N,N-dialkoxyacryl amide, N,N-dialkoxymethacryl amide (the alkoxy group may be methoxy, ethoxy, butoxy, isobutoky, etc.), acryloyl morpholine, N-methylol acrylamide, N-methylol methacrylamide, N-phenyl acrylamide and N-phenyl methacrylamide; monomers of acid anhydrides such as maleic anhydride and itaconic anhydride; vinyl isocyanate, allylisocyanate, styrene, α-methyl styrene, vinylmethyl ether, vinylethyl ether, vinyltrialkoxy silane, alkylmaleic acid monoester, alkylfumaric acid monoester, alkylitaconic acid monoester, acrylonitrile, methacrylonitrile, vinylidene chloride, ethylene, propylene, vinyl chloride, vinyl acetate and butadiene.

<Content Ratio of the Polymer Binder>

The polyester resin forming the coating layer is contained in an amount of preferably 5 to 95 w/t %, more preferably 50 to 90 w/t %, in the coating layer. The acrylic resin which contains oxazoline groups and polyalkylene oxide chains and which forms the coating layer is contained in an amount of preferably 50 to 90 w/t %, and more preferably 10 to 50 w/t %, based on the coating layer. When the amount of the polyester resin is over 95 w/t %, or when the amount of the acrylic resin which contains the oxazoline groups and polyalkylene oxide chains is less than 5 w/t %, the adhering power of the coating layer is reduced, resulting in insufficient adhesion to a hard coat and adhesive. When the amount of the acrylic resin is greater than 90 w/t %, the adhering power to the polyester film is reduced, resulting in insufficient adhesion to a hard coat and to adhesive, which is not preferable.

<Inert Particles>

Preferred inert particles constituting the coating layer of the invention are composite inorganic particles of silica and titania. The composite inorganic particles are suitable because their refractive index can be optionally and easily controlled. As the refractive index of the polymer binder is in the range between 1.50 and 1.60, the index of the globular particles can be easily adjusted to that of the polymer binder. The index of the globular particles also is preferably in the range between 1.50 and 1.60.

The average particle size of the globular particles is preferably 40 to 120 nm. When the average particle size is greater than 120 nm, particles are likely dropped off, while when the particle size is less than 40 nm, no sufficient lubricity and flaw resistance are obtained, which is not preferable. The inert particles are contained preferably in an amount of 0.1 to 10 w/t % of the coating layer. When the amount is less than 0.1 w/t %, no sufficient lubricity and flaw resistance are obtained. When the amount is greater than 10 w/t %, the cohesive force of the coating film is decreased, resulting in degrading the adhesion, which is not preferable.

<Aliphatic Wax>

The coating layer preferably contains aliphatic wax to obtain lubricity at the film surface. The aliphatic wax is contained preferably in an amount of 0.5 to 30 w/t %, and more preferably 1 to 10 w/t %, based on the total weight of the coating layer. When the wax is contained in an amount of less than 0.5 w/t %, the film surface may be in short of lubricity, which is not preferable. When the wax is contained in an amount of greater than 30 w/t %, there may be short of, the adhesion to the polyester film base and, the easy adherence to the hard coat, adhesive, etc. Concrete examples of the aliphatic wax include plant waxes such as carnauba wax, candelilla wax, rice wax, Japanese wax, jojoba oil, palm wax, rosin modified wax, ouricury wax, sugarcane wax, Esparto wax and bark wax; animal waxes such as bees wax, lanoline, whale wax, Ibotaro wax, and shellac wax; mineral waxes such as montan wax, ozokerite and ceresine wax; petroleum waxes such as paraffin wax, microcrystalline wax and petrolatum wax; and synthetic hydrocarbon waxes such as Fischer-Tropsch wax, polyethylene wax, polyethylene oxide wax, polypropylene wax and polypropylene oxide wax. From among these waxes, carnauba wax, paraffin wax and polyethylene wax are particularly preferred in view of the easy adherence to the hard coat, adhesive, etc. and of the excellent lubricity. These waxes are used preferably in a form of an aqueous dispersion for the decrease of burdens on the environment and for the ease of handling.

<Additives>

The coating layer may contain other inert particles to the extent not to affect the transparency, for improving the lubricity and flaw resistance. Examples of the other inert particles include inorganic inert particles of calcium carbonate, magnesium carbonate, calcium oxide, zinc oxide, magnesium oxide, silicon oxide, silicate of soda, aluminum hydroxide, iron oxide, zirconium oxide, barium sulfate, titanium oxide, tin oxide, antimony trioxide, carbon black, molybdenum disulfide, etc.; and organic inert particles of acrylic cross-linking polymer, styrene-type cross-linking polymer, silicone resin, fluorine resin, benzoguanamine resin, phenolic resin, nylon resin, etc. Among them, water-insoluble solids are preferably inert particles having a specific gravity of less than 3, to be prevented from setting out in an aqueous dispersion.

<Properties of the Laminated Polyester Film>

The laminated polyester film of the invention has properties below:

<Haze>

The laminated polyester film of the invention should have a haze of 1.5% or less. When the haze is over 1.5%, the transparency of the film is degraded and the brightness is reduced, and the film cannot be used for display purposes. The haze is preferably 1.0% or less, more preferably 0.5% or less.

<Total Light Transmittance>

The laminated polyester film of the invention should have a total light transmittance of 85% or more. When the transmittance is less than 85%, the transparency of the film is degraded and the brightness is reduced, and the film cannot be used for display purposes. The total light transmittance is preferably 87% or more, more preferably 90% or more.

<50% Destruction Energy>

The laminated polyester film of the invention should have a 50% destruction energy at 100 μm thickness of 0.3 J or higher. When the energy is less than 0.3 J, the film is reduced in impact resistance and it is likely broken, and the film is not suitable to be used for flexible display devices. The 50% destruction energy at 100 μm thickness is preferably 0.4 J or higher, and more preferably 0.5 J or higher.

<Thermal Shrinkage Ratio>

The laminated polyester film of the invention should have a thermal shrinkage ratio of 4% or less, at 230° C. for 30 minutes. When the shrinkage ratio is greater than 4%, the laminated film may be cracked at the time or after a functional layer is laminated to the film, or the laminated film may be creased to be broken, resulting in that the film cannot fulfill its function. The thermal shrinkage ratio is preferably 2% or less, and more preferably 1% or less.

<Surface Roughness>

The laminated polyester film of the invention has preferably 2 to 20 nm of the average roughness (SRa) at three dimensional center lines on any of the film surfaces. When the SRa is less than 2 nm, sufficient lubricity cannot be obtained, causing difficulty in winding the film. When the SRa is over 20 nm, there occurs a coating failure or depositing failure at the time a functional layer is laminated onto the film even if the film has improved lubricity, and the film may not fulfill its function.

The laminated polyester film of the invention has preferably a ten points-average roughness Rz of at least one surface, of the value in the range between 50 to 150 nm. When Rz is less than 50 nm, sufficient lubricity cannot be obtained, causing difficulty in winding the film. When the Rz is over 150 nm, there occurs a coating failure or depositing failure at the time a functional layer is laminated onto the film even if the film has improved lubricity, and the film may not fulfill its function.

<Index of Refractive Indexes>

According to the invention, when the film is produced by a continuous film-production process, suppose that the refractive index of the continuous film-production direction is set as nMD and that of the direction vertical to the continuous film-production direction is set as nTD. Then, the absolute value of the index of difference in refractive indexes of the film surface direction is preferably 50 or less, where the index is represented by the following formula:

$$\Delta n = (nMD - nTD) \times 1000$$

wherein $\Delta n$ is preferably −50 to +50, more preferably −40 to +40, and still more preferably −30 to +30.

When the absolute value $\Delta n$ is greater than 50, there increases the anisotropy to the surface direction of the film and so the anisotropy in the thermal shrinkage is increased, causing creases or cracks to a particular direction at the time a functional layer is laminated, and the film may not fulfill its function.

<Young's Modulus>

The laminated polyester film of the invention has preferably a Young's modulus of 3 to 15 GPa. When the modulus is less than 3 GPa, the film is likely extended and is not suitable to be handled in a form of a roll. When the modulus is greater than 15 GPa, the film is not preferred from the point of productivity. The Young's modulus is preferably 4 to 12 GPa, and more preferably in the range between 5 and 10 GPa.

<Thickness>

The laminated polyester film of the invention should have a thickness sufficient for being used as supports which are strong enough and which can be bent freely to a certain extent to be used for liquid crystals, hard coats, touch panels, anti-dazzle treatment goods, electromagnetic wave shield films for plasma display panels (PDP), organic electroluminescence displays (organic ELs), electronic papers, solar cells, etc. The thickness is preferably in the range between 12 and 500 μm, more preferably in the range between 25 and 350 μm, and still more preferably 50 and 250 μm. According to the invention, the laminated polyester film contains no filler or contains only small sized filler in an amount not to affect the features of the film.

<Method for Producing a Laminated Polyester Film>

The laminate polyester film of the invention can be produced, for example, by melting and extruding the above polyester in a form of a film, cooling and solidifying the extruded film in a casting drum to produce a not-yet stretched film. The not-yet stretched film is biaxially stretched to the lengthwise- and crosswise-directions at a temperature of Tg~(Tg+60)° C. by 2.0- to 5.0-fold, and heat-fixed at a temperature of (Tm−100) to (Tm−5)° C. for 1 to 10 seconds, whereby a desired film can be obtained. The film can be stretched by a normally adopted method, such as the method using rolls or stenters. The film can be stretched lengthwise and to crosswise simultaneously, or can be stretched sequentially lengthwise and then crosswise. When the film is stretched sequentially, an aqueous liquid for a coating layer is applied on a monoaxially oriented film, and the film is stretched to the other direction, followed by heat-fixing the aqueous liquid. The coating liquid can be applied by roll coating, gravure coating, roll brushing, spray coating, air knife coating, impregnation, curtain coating, etc. These methods can be adopted either singly or in a form of a combination. The term "Tg" herein means the glass transition temperature of a polymer, and the term "Tm" means the melting point of a polymer.

When the film is provided with a loosening treatment, a heating treatment at a temperature of (X−80)~X° C. of the film is applied, wherein X represents a heat fixing temperature. The loosening treatment may be carried our by a method comprising cutting off both ends of the film in the midway of the heat-fixing zone between the heat-fixing step and the winding step, and slowing down the taking up speed relative to the feeding speed of the film; a method comprising heating the film by an IR heater while the film is fed between feeding rollers having different speeds; a method comprising feeding the film on a heated feeding roller and slowing down the speed of the feeding roller; a method comprising heat-fixing the film, feeding the film on a nozzle which blows hot air, and decelerating the taking up speed than the feeding speed; a method comprising winding up the film to a film forming machine, feeding the film by a heated feeding roller and slowing down the speed of the feeding roller; and a method of feeding the film through a heating oven or a heating zone heated by an IR heater, and decelerating the speed of the roller after passing the heating roller than the speed of the roller before the film passes the heating zone. Any of the methods may be adopted. The roller speed at the film taking side is preferably 0.1 to 10% slow-down from that at the supply side.

For the coating layer in particular, materials having the features mentioned above should be used to produce the film with the characteristics necessary for the invention.

<Laminated Film>

According to the present invention, following embodiments are included as preferred working examples.

<Hard Coat Layer>

According to the laminated polyester film of the invention, a hard coat layer may be provided on the coating layer to prepare a useful laminate. For the hard coat layer, it is preferred to use a chemical resistant, flaw resistant and thermosetting resin, examples of which include an ionizing radiation-setting resin, thermo-setting resin and thermoplastic resin. Among them, the ionizing radiation-setting resin is preferable because a film-producing work over the transparent base film is easy and because its pencil hardness can be easily elevated to a desired value. The ionizing radiation-setting resin used for forming the hard coat layer is preferably a resin which has acrylate-type functional groups. Polyester acrylate or urethane acrylate is particularly preferred. The polyester acrylate is composed of acrylate and/or methacrylate of the oligomers comprising polyester-based polyols [hereinafter acrylate and methacrylate may be referred to as (meth) acrylate]. The urethane acrylate is composed of acrylate of oligomers comprising polyol compounds and diisocyanate compounds. Examples of the monomers composing the acrylate include methyl(meth)acrylate, ethyl(meth)acrylate, butyl(meth)acrylate, 2-ethylhexyl(meth)acrylate, methoxyethyl(meth)acrylate, butoxyethyl(meth)acrylate, and phenyl(meth)acrylate.

When it is desired to further elevate the hardness of the hard coat layer, a poly-functional monomer also may be used. Examples of the poly-functional monomer include trimethylolpropane tri(meth)acrylate, hexanediol(meth)acrylate, tripropyleneglycol di(meth)acrylate, diethyleneglycol di(meth)acrylate, pentaerythritol tri(meth)acrylate, dipentaerythritol hexa(meth)acrylate, 1,6-hexanediol di(meth)acrylate, and neopentylglycol di(meth)acrylate.

Examples of polyester-base oligomers used to form the hardcoat layer include those of adipic acid and glycol (ethylene glycol, polyethylene glycol, propylene glycol, butyleneglycol, polybutyleneglycol, etc.), triol (glycerine, trimethylol propane, etc), polyadipate triol which is a condensation product of a sebacic acid with glycol or triol, or polysebacate polyol. A part of or all of the above aliphatic dicarboxylate may be replaced by other organic acid. Examples of the other organic acid include isophthalic acid, terephthalic acid, phthalic anhydride, etc., which contribute to increase the hardness of the hard coat layer.

The polyurethane-base oligomers used for forming the hard coat layer can be obtained from condensation products of polyisocyanate and polyol. Examples of the concrete isocyanate include methylene bis (p-phenylene diisocyanate), an addition product of hexamethylene diisocyanate hexanetriol, hexamethylene diisocyanate, an adduct of tolylene diisocyanate trimethylolpropane, 1,5-naphtylene diisocyanate, thiopropyl diisocyanate, ethylbenzene-2,4-diisocyante, 2,4-tolylene diisocyanate dimer, hydrogenated xylylene diisocyanate, and tris(4-phenylisocyanate)thiophosphate. Examples of the concrete polyol include polyether-based polyol such as polyoxytetramethylene glycol; polyester-based polyol such as polyadipate polyol and polycarbonate polyol; and copolymers of acrylic acid esters and hydroxyethyl methacrylate.

When an ultraviolet-setting resin is used as the ionizing radiation-setting resin, there may be preferably mixed into the resin acetophenones, as a photopolymerization initiator, benzophenones, Michler's benzoyl benzoate, α-amyloxime ester or thioxanthones and, as a photo sensitizer, n-butylamine, triethylamine, tri-n-butylphosphine, etc.

The urethane acrylate is rich in elasticity and flexibility, and excels in processing property (bending property), but is short of surface hardness and it is not possible to have a 2H pencil hardness or harder. Contrary to the urethane acrylate, the polyester acrylate can form an extremely hard hard-coat layer by appropriately selecting materials constituting the polyester. In order to obtain a hard coat which has both highly hard and flexible properties, there is preferably used a mixture of 60 to 90 parts by weight of urethane acrylate and 40 to 10 parts by weight of polyester acrylate.

The coating liquid used for forming the hard coat layer comprises preferably fine particles of inactive materials having a secondary particle size of 20 μm or less in an amount of 0.3 to 3 parts by weight based on 100 parts of resin materials, to adjust the gloss and to pertain lubricity to the surface of the hard coat layer. When the amount is less than 0.3 parts by weight, the lubricating effect is low while when the amount is greater than 3 parts by weight, the pencil hardness of the obtained hard coat layer may be reduced. Examples of the fine particles of the inactive materials include inorganic fine particles of silica, magnesium carbide, aluminum hydroxide, barium sulfate, etc., and fine particles of organic polymers such as polycarbonate, acrylic resin, polyimide, polyamide, polyethylene naphthalate, melamine resin, etc.

The hard coat layer may contain ultraviolet ray absorbers to prevent transparent base materials and colorants (especially dyes) from being degraded by ultraviolet ray, and to maintain visibility and explosion-protection for a long time. Although there is no limitation to the type of the ultraviolet ray absorbers, any one of said specified cyclic imino esters may be preferably selected. The ultraviolet ray absorber may be used in an amount of 0.1 to 10% by weight based on the weight of the resin for forming the hard coat layer. When the amount used is less than 0.1% by weight, the ultraviolet ray preventing effect is low while when the amount is greater than 10% by weight, there may reduce the wear resistance and graze resistance. The ultraviolet ray absorber is preferably added in a form of dispersion in a solvent.

To form the hard coat layer, the coating liquid is applied by a known method, such as roll coating, gravure coating, bar brushing, pushing-out coating and the like, selected depending on the features and the amount of the liquid. Although there is no limitation to the thickness of the hard coat layer, 1 to 15 μm thickness is preferred. The concentration of the solid content of the coating liquid is preferably 30 to 70% by weight, and more preferably 40 to 60% by weight.

The structure of the laminated film having a hard coat layer, may be that in which the hard coat layer is provided on a coating layer of a laminated polyester film of the invention, that in which a hard coat layer is provided on both the coating layer and the base film, or that in which a hard coat layer is provided on each of the coating layers provided on both sides of the base film. These structures also of the laminated film are included in the invention.

<Gas Barrier Layer>

A gas barrier layer may be provided on the laminated polyester film of the invention, to form a more useful laminated film. The gas barrier layer may be formed directly on the coating layer of the laminated polyester film, or via a hard coat layer provided on the coating layer of the laminated polyester film. It may be formed on a base film at the side opposite to that on which a coating film is applied. The gas barrier layer is particularly preferred for the use of liquid crystal display panels or organic electroluminescence panels. Any of the organic materials and inorganic materials is used as the material for the gas barrier layer.

Examples of the material for the gas barrier layer include vinyl alcohol copolymers such as polyvinyl alcohol, vinyl alcohol-ethylene copolymer; acrylonitrile copolymers such as polyacrylonitrile, acrylonitrile-methylacrylate copolymer, acrylonitrile-styrene copolymer; organic polymer weight materials such as polyvinylidene chloride. These materials may be processed to a gas barrier layer provided on polyester of the invention by a wet coating method using gravure coater or a reverse coater. When a polyvinyl barrier layer is used, oxygen barrier properties are likely decreased rapidly due to absorption of moisture. Therefore, it is preferred to form a steam barrier separately.

Inorganic materials for a gas barrier layer may be metal oxides or metal nitrides of one or two metals selected from the group consisting of silicon, aluminum, magnesium and zinc. These materials are known as having high gas barrier properties. A layer of oxides of these materials can be formed by any gaseous phase deposition methods such as a sputtering, vacuum deposition, ion plating, plasma CVD wherein materials are deposited from a gaseous phase to form a film.

From among them, the metal oxide based on silicon oxide in which the number of oxygen atoms to that of silicon atoms is 1.5 to 2.0 is preferred in view of the gas barrier property, transparency, surface smoothness, bending property, film stress, costs, etc.

The ratio of the number of oxygen atoms to that of silicon atoms may be analyzed and determined by an electron spectroscopy for chemical analysis, micro-electron spectroscopy for chemical analysis, Auger electron spectroscopy, Rutherford back scattering spectroscopy, etc. When the ratio is less than 1.5, the bending property and transparency may be decreased and the ratio is preferably 1.5 to 2.0.

The thickness of the organic gas barrier of a metal oxide is preferably 5 to 200 nm. If the thickness is less than 5 nm, it is difficult to form a uniform layer, and there generates a part where no film layer is formed and gas penetrates through the part, causing degrading the gas barrier property. When the thickness is greater than 200 nm, the layer lacks transparency, loses bending property and cracks are generated, resulting in the degradation of the gas barrier property. Generally, the residual stress in a metal oxide layer increases with the increase in thickness of a metal oxide, although characteristics of the metal oxide vary depending on the film-producing process. Therefore, when the thickness of the transparent conductive polymer substrate of the invention is increased, the curl of the substrate after a metal oxide layer is formed will be increased, which is not preferable. To obtain high transparency, it is preferred to use the above silicon oxide which contains magnesium fluoride in an amount of 5 to 30% by weight based on the total weight of the gas barrier layer. In this instance, the thickness of the layer should be 60 to 200 nm in view of the gas barrier property.

The gas barrier layer may be formed either singly or in a plurality of layers. A combination of an organic gas barrier layer and an inorganic gas barrier layer is particularly preferred due to a synergistic effect of the resistance of the organic layer to cracks and of the resistance of the inorganic layer to water steam. Further, a various type of anchor layers may be formed between the surface of the gas barrier layer and the barrier layer to increase the adhesion therebetween. These anchor layers need to have chemical resistance, transparency and good adhesion between layers. For these purposes, there may be used silicon-containing resins, thermosetting resins such as epoxy resins, radiation setting resins such as ultraviolet ray setting acrylic resin, melamine resins, urethane resins, alkyd resins, etc.

The structure of the laminated film having a gas barrier layer may be such that a gas barrier layer is provided on a coating layer of a laminated polyester film of the invention, that a gas barrier is provided on a base film, or that a gas barrier is provided on both a coating layer and a base film. Such structures also are included in the invention.

<Transparent Conductive Layer>

A transparent conductive layer may be formed on the laminated polyester film of the invention to form a more useful laminated film. The conductive layer is necessary when the laminated polyester film of the invention is used, for example, for, electroluminescence (EL), electronic paper or solar batteries.

The conductive layer should be made of transparent and conductive materials. Examples of such materials include metal oxides such as indium oxide, cadmium oxide and tin oxide to which is added, as impurities, tin, tellurium, cadmium, molybdenum, tungsten, fluorine, etc., and zinc oxide and titanium oxide to which aluminum is added as impurities. Particularly, a thin film of indium-tin oxide (ITO) containing 2 to 15% by weight of tin oxide is preferred for reasons of improved transparency and conductivity.

The thickness of the transparent conductive layer may be determined depending on the desired surface resistance. The surface resistance value of the transparent conductive layer is set from 300Ω/□ to 1Ω/□ depending on the desired application, and the thickness of the layer is formed normally from 10 nm to 400 nm. However, when a transparent conductive layer is formed on a polymer substrate having flexibility, it should be formed thin for preventing the layer from being cracked and the thickness of the layer is preferably 30 to 140 nm. To obtain a low resistance value, the transparent conductive layer is preferably provided with a thermal treatment at a temperature of 130 to 200° C.

The structure of the laminated film having a transparent conductive layer may be that in which a transparent conductive layer is provided on a coating layer of a laminated polyester film, in which a transparent conductive layer is provided on a base film, or in which a transparent conductive layer is provided on both a coating layer and a base film.

The transparent conductive layer may be provided via a hard coat layer, via a gas barrier layer, or via a hard coat layer and a gas barrier layer. These types of structures are also included in the present invention.

An example of the laminated film of the invention comprises a transparent conductive layer provided via a hard coat layer and a gas barrier layer in this order on a coating layer. The laminated film has a 50% destructing energy per 100 μm film thickness of preferably 0.3 J or greater, more preferably 0.4 J or greater, and still more preferably 0.5 or greater. When the energy is less than 0.3 J, the film lacks shock resistance, and is liable to be cracked. Therefore, the film cannot be used for flexible display devices.

<Use>

The laminated polyester film or the laminated film of the invention is suitably used for display applications, solar batteries, and windows. For the display applications, the film is used for liquid crystals, organic electroluminescence displays (ELs), Electronic paper, touch panels and Electromagnetic shield films for plasma display panels (PDP).

For example, when the film of the invention is used for organic ELs, luminescence materials may be laminated to the film of the invention. When the film of the invention is used for the electronic paper, image displaying elements may be laminated onto the film. When the film is used for solar batteries, solar battery elements may be applied to the film. For these applications, the laminated film of the invention can be used in a manner thinner and more impact resistant than conventional materials.

As EL luminescent materials, there may be used following pigment type luminescent materials, metallic complex type luminescent materials and polymer type luminescent materials.

Examples of the pigment type luminescent materials include cyclopentadiene derivatives, tetraphenylbutadiene derivatives, triphenylamine derivatives, oxadiazole derivatives, pyrazoloquinoline derivatives, distyrylbenzene derivatives, distyrylarylene derivatives, sirole derivatives, thiophene ring compounds, pyridine ring compounds, perynone derivatives, perylene derivatives, oligothiophene derivatives, oxadiazole dimers and pyrazoline dimers.

Examples of metallic complex type luminescent materials include alumiquinolinol complex, benzoquinolinol beryllium complex, benzoxazole zinc complex, benzthiazole zinc complex, azomehyl zinc complex, porphyrin zinc complex and europium complex, and metallic complexes having, as central metal, Al, Zn, Be, etc. or rare-earth metals such as Th, Eu, Dy, etc., and as ligands, metallic complexes such as oxazole, thiadiazole, phenyl pyridine, phenyl benzoimidazole and quinoline structures.

Examples of polymer type luminescent materials include polyparaphenylene vinylene derivatives, polythiophene derivatives, polyparaphenylene derivatives, polysilane derivatives, polyacetylene derivatives, polyvinylcarbazole, polyfluorenone derivatives, polyfluorene derivatives, polyquinoxaline derivatives and their copolymers.

EXAMPLES

The present invention will be described more specifically below with reference to working examples. Physical properties and characteristic features were determined by the methods shown below.
(1) Film Thickness
The film thickness was determined by an electronic micrometer (produced by Anritsu KK; tradename: K-312A), with a needle pressure of 30 g.
(2) Haze and Total Light Transmittance
The total light transmittance Tt(%) and the scattered light transmittance Td(%) were obtained following JIS Standard K6714-1958, and the haze [(Td/Tt)×100] (%) was calculated.
(3) Surface Roughness
(3-1) Three-dimensional Centerline Roughness SRa
A non-contacting type, three-dimensional roughness gauge (produced by Kosaka Kenkyusho; tradename: ET30HK) was used to determine the surface roughness SRa by the following conditions:
A semiconductor laser having a wave length of 780 nm
Measured length: 1 mm
Sampling pitch: 2 μm
Cut off: 0.25 mm
Lengthwise (continuous film-producing direction) magnification: 100,000-fold
Crosswise (vertical direction to the continuous film-producing direction) magnification: 200-fold
Scanning ruling: 100.
(3-2) Ten Points-average Roughness Rz
An atomic force microscope (produced by Digital Instruments; tradename: Nano Scope III AFM, J scanner) was used to measure Rz by the following conditions:
Probe: Single bond silicon sensor
Scanning mode: tapping mode
Number of pixels: 256×256 data points
Scanning speed: 2.0 Hz
Measuring circumstance: room, atmospheric conditions
Scanning scope: 10 μm.
(4) Thermal Shrinkage Ratio
A film sample was marked with reference points at intervals of 30 cm and was heat treated in an oven at a predetermined temperature without applying a load. After the heat treatment, the distance between reference points was measured to the continuous film-producing direction (MD direction) and to the direction vertical to the film-producing direction (TD direction), and the thermal shrinkage ratio was calculated based on the following formula:

Thermal shrinkage ratio (%)=(distance between reference points prior to heat treatment−distance between reference points after to heat treatment)/distance between reference points prior to heat treatment×100

(5) Index Δn of the Difference in Refractive Indexes of the Film
Refractive indexes to the continuous film-producing direction and to the direction vertical to the film-producing direction at the wave length of 473 nm, 633 nm and 830 nm were measured by a prism coupler (produced by Metricon; trade name: Model 2010). The obtained values were applied to Cauchy's dispersion equation below:

$$n_i = a + [b/(\lambda_i)^2] + [c/(\lambda_i)^4]$$

wherein $\lambda_i$ represents a measured wave length, and $n_i$ is a refractive index measured with wave length $\lambda_i$. Constants a, b and c were obtained by solving the simultaneous equation. Using the obtained values a, b and c, the refractive index of the film at wave length 589 nm (wavelength of Na D line) was calculated. The index Δn of the difference in refractive indexes of the film was calculated by the following equation:

$$\Delta n = (nTD - nMD) \times 1000$$

(6) Refractive Index of the Coating Layer Components
With respect to the polymer binder, coating materials were dried to be a solid plate at 90° C. and were measured by an Abbe refractive meter (D line: 589 nm). Inert particles were dried to be solid at a temperature of 90° C. and were suspended in liquids, maintained at 25° C., which have various refractive indexes, and the refractive index of the most transparent suspension was measured by an Abbe refractive meter (D line: 589 nm).
(7) Glass Transition Temperature
About 10 mg of sample was sealed in a measuring aluminum pan mounted to a differential thermal meter (produced by TA Instruments; trade name: DSC 2920), heated from 25° C. to 300° C. at a speed of 20° C./minute. After the sample was maintained at 300° C. for 5 minutes, it was transferred on ice to be rapidly cooled. The pan was mounted again to the differential thermal meter, and was warmed up from 25° C. at a speed of 10° C./minute to measure the glass transition temperature (Tg:C)
(8) Intrinsic Viscosity
The intrinsic viscosity ([η]dl/g) was determined by an o-chlorophenol solution at 35° C.
(9) Thickness of the Coating Layer
A small piece of the film was embedded in an epoxy resin (produced by Refinetec; trade name: EPOMOUNT) and was sliced with a 50 nm thickness by Microtome 2050 produced by Reichert-Jung Company, examined by a transmission electron microscope (LEM-2000) with an acceleration voltage of 100 KV and with a magnification of 100,000-fold, to determine the thickness of the coating film layer.

(10) Average Particle Size

Procedures same as those for measuring the thickness of the coating layer were repeated to measure the particle size of 100 particles. The average size of the 100 particles was taken as the average particle size.

(11) Young's Modulus

The film was cut to have 10 nm width and 15 cm length with a chuck distance of 100 mm. The obtained sample was pulled by an Intron type universal tensile tester with a pulling speed of 10 mm/min. and a chart speed if 500 mm/min. The Young's modulus was calculated for the continuous film-producing direction (MD direction) and the direction vertical to the film-producing direction (TD direction), using the tangential line of the rising part of the obtained load-elongation curve.

(12) Lubricity

A load $T_1$ (g) of 40 g/mm$^2$ was applied to a film having slits at intervals of 10 mm width by a friction tester (produced by Hoyo Electronics Corp.; tradename: SFT-1200S) to have the film contacted with a pin with an angle of 90° wherein the SUS 304 pin has a surface roughness Ra of 20 nm, and an outer diameter of 6 mmΦ. Then the take-up load $T_2$(g) was detected when the film was run at a speed of 20 mm/sec, and the frictional coefficient µ was calculated based on the following formula and was evaluated based on the following criteria:

$$\mu = 1/n(T_1/T_2)$$

○=0.35 or less

Δ=from 0.35 to 0.40

X=0.4 or more.

(13) Adhesion to the Hard Coat Layer

A hard coat layer of 5 µm thickness, formed on the coated surface of the polyester, was cross cut to form 100 pieces of 1 mm$^2$ grids. Cellophane tape (produced by Nichiban) having 24 mm width was pasted on the grids and was rapidly peeled off with a peeling angle of 180°. The surface from which the tape was peeled off was observed and was evaluated in accordance with the following criteria.

○: peeled off area is 10% or less . . . extremely good adhesion

Δ: peeled off area is 10% or more and 40% or less . . . good adhesion

X: peeled off area is 40% or more . . . extremely insufficient adhesion.

(14) Shock Resistance

Figure 1:
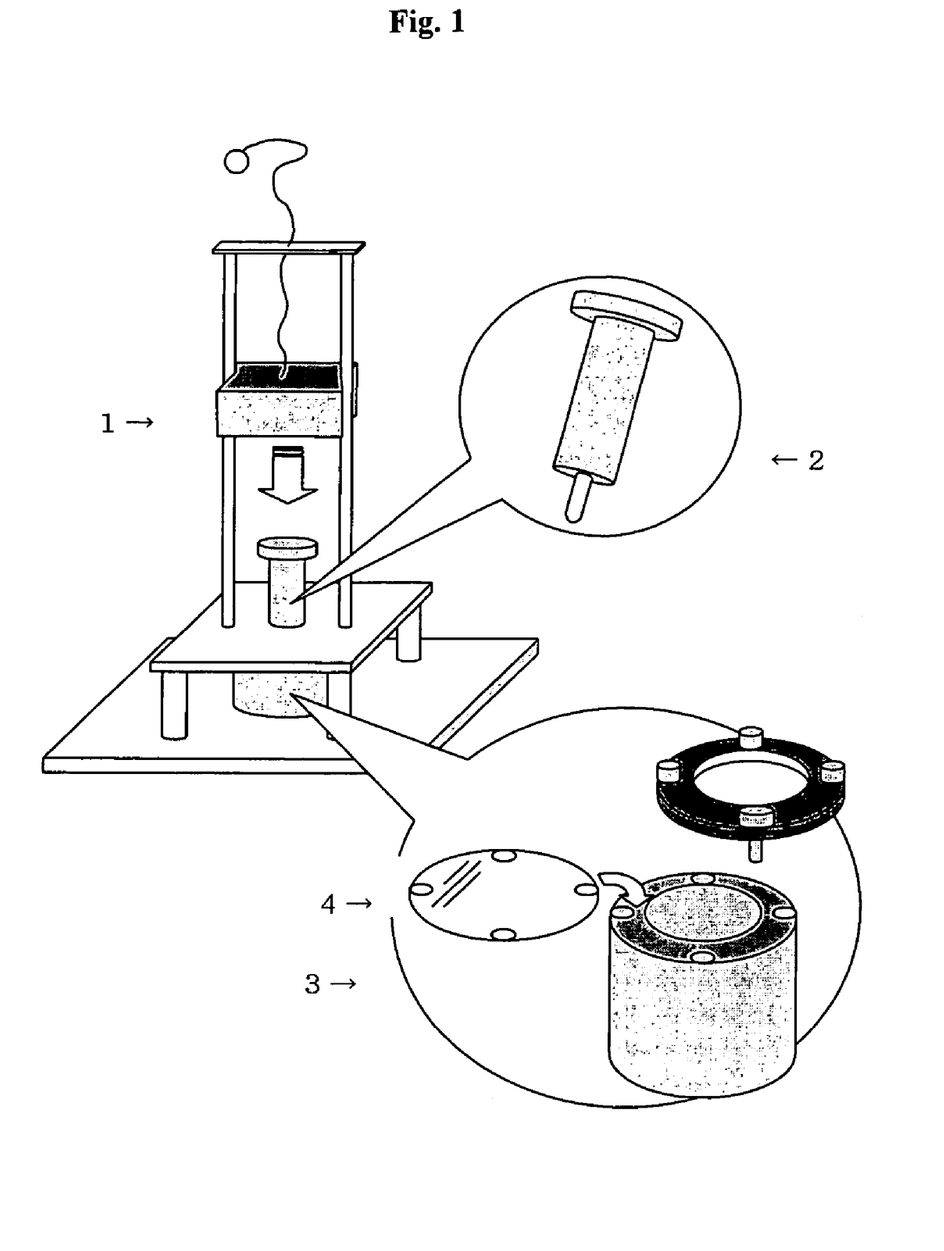
FIG. 1 shows a shock resistance tester used for determining 50% destruction energy, wherein numerical references show following elements:
1 . . . a weight of 300 g or 500 g
2 . . . a U-type punch of 4 mmΦ and 142 g
3 . . . a film fixing jig
4 . . . a film.

A 50% destruction energy E(J) of the film was measured by a shock resistance tester shown in FIG. 1, and the value was calculated in accordance with JIS K7211. In the drawing, numerical reference 1 is a weight (mass of 300 g or 500 g), 2 is a U type punch (top diameter of 4 mm, mass of 142 g), 3 is a film fixer and 4 is a sample film. The 50% destruction energy $E_{50}$(J) per 100 µm film thickness was calculated based on the following equation:

$$E_{50} = E \times 100(\mu m)/\text{sample film thickness }(\mu m)$$

(15) Structure of the Coating Layer

The structures of the coating layer used in Examples and Comparative Examples are shown in Table 1. The components composing the coating layer are as follows:

TABLE 1

| | | Structure of the coating layer (w/t %) | | | | | | |
|---|---|---|---|---|---|---|---|---|
| | | Polymer binder | | Inert particles | | | Others | Refractive index of polymer binder |
| | | Polyester | Acryl | 1 | 2 | Wax | Wetting agent | |
| Coating liquid No. | 1 | 67 | 20 | 3 | — | 5 | 5 | 1.57 |
| | 2 | 67 | 20 | — | 3 | 5 | 5 | 1.57 |
| | 3 | 70 | 20 | — | — | 5 | 5 | 1.57 |

Polyester:

The polyester resin comprises, as acid components, 63 mol % of 2,6-naphthalene dicarboxylic acid/32 mol % of isophthalic acid/5 mol % of 5-sodium sulfoisophthalic acid and, as glycol components, 90 mol % of ethylene glycol/10 mol % of diethylene glycol, with Tg of 76° C. and an average molecular weight of 12,000. The polyester A1 was prepared, in accordance with the procedure shown in Example 1 of Kokai (Jpn. Unexamined Patent Publication) 06-116487, as follows:

42 parts of dimethyl 2,6-sodium dicarboxylate, 17 parts of dimethyl isophthalate, 4 parts of dimethyl 5-sodium sulfoisophthalate, 33 parts of ethylene glycol and 2 parts of diethylene glycol were charged into a reactor, followed by an addition of 0.05 parts of tetrabutoxy titanium. The mixture was heated to a temperature controlled to 230° C. under a nitrogen atmosphere, to carry out an ester exchange reaction while distilling off the produced methanol. Then, the temperature of the reaction system was gradually elevated to 255° C. to carry out a polycondensation reaction under a reduced pressure of 1 mmHg, whereby the polyester was obtained.

Acryl:

The acrylic resin comprises 30 mol % of methyl methacrylate/30 mol % of 2-isopropenyl-2-oxazoline/10 mol % of polyethyleneoxide (n=10)methacrylate/30 mol % of acrylamide, with Tg (glass transition temperature) of 50° C. The acrylic resin was prepared, in accordance with the procedure shown in Production Examples 1 to 3 of Kokai (Jpn. Unexamined Patent Publication) 63-37167, as follows:

302 parts of ion exchanged water were charged into a four-neck flask, and was heated to 60° C. under a nitrogen stream, followed by an addition of 0.5 parts of ammonium persulfate and 0.2 parts of sodium hydrogen nitrite, as polymerization initiators. Further, a mixture of monomers comprising 23.3 parts of methyl methacrylate, 22.6 parts of 2-isopropenyl-2-oxazoline, 40.7 parts of polyethyleneoxide (n=10)methacrylate, and 13.3 parts of acrylamide were dropped for three hours, adjusting the temperature of the liquid to be in the range between 60 to 70° C. The temperature range was maintained after the completion of the dropping for two hours, to maintain the reaction under stirring. The reactants were subsequently cooled to obtain an aqueous dispersion of the acrylic resin containing 25% of a solid component.

Inert Particles 1:

Inert particles 1 comprise composite inorganic particles of silica and titania, having an average particle size of 100 nm. The particles were prepared, in accordance with the procedure shown in Production Examples and Working Examples shown in Kokai (Jpn. Unexamined Patent Publication) 7-2520, as follows:

140 g of methanol, 260 g of isopropanol and 100 g of aqueous ammonia (25 w/t %) were charged into a glass reactor having stirring impellers and with an inner volume of 4 litters to prepare a reaction liquid. The reaction liquid was maintained at 40° C. with stirring. Then, into a 3 litter triangular flask were charged 542 g of a silicon tetramethoxide [$Si(OMe)_4$, supplied by Colcoat; tradename: METHYL-SILICATE 39], followed by an addition under stirring of 195 g of methanol and 28 g of 0.1 w/t % aqueous hydrochloric acid solution (35% hydrochloric acid, supplied by Wako Jyunyaku Kogyo, and was diluted with water to $\frac{1}{1000}$ solution), and the mixture was stirred for about 10 minutes. Subsequently, a liquid comprising 300 g of titanium tetraisopropoxide [$Ti(O-i-Pr)_4$, supplied by Nippon Soda with a trade name of A-1 (TPT)] diluted with 634 g of isopropanol was added to the product to obtain a transparent uniform solution (co-condensation product of silicon tetraalkoxide and titanium tetraalkoxide). Each of 1,669 g of the uniform solution and 480 g of the aqueous ammonia (25 w/t %) was simultaneously dropped into the reaction liquid for two hours such that the dropping speed was slow at the start and the speed was increased at the ending stage. After the completion of the drop, the obtained co-hydrolyzate was filtered while the organic solvent was dried at 50° C., and was dispersed in water to obtain inert particles 1 having a concentration of 10% by weight and a refractive index of 1.56.

Inert Particles 2:

There was used silica filler having an average particle size of 200 nm and a refractive index of 1.42, supplied by Nissan Kagaku KK with a trade name of MP-2040.

Wax:

There was used Carnauba wax supplied by Chukyo Yushi KK with a trade name of SELOSOL 524.

Wetting Agent:

There was used polyoxyethylene (n=7) lauryl ether (supplied by Sanyo Kasei KK; tradename: NAROACTY-N-70)

Example 1

A mixture of 100 parts of dimethyl naphthalene-2,6-dicarboxylate, 60 parts of ethylene glycol, and 0.03 parts of tetrahydrate manganese acetate as an ester exchange catalyst, was gradually heated from 150° C. to 238° C. to carry out an ester exchange reaction for 120 minutes. When the temperature reached 170° C., 0.024 parts of antimony trioxide was added. After completion of the ester exchange reaction, there was added trimethyl phosphate (a solution heat-treated in ethylene glycol at 135° C. for 5 hours in a pressure of from 0.11 to 0.16 MPa: 0.023 parts in terms of trimethyl phosphate). Then, the reaction product was transferred to a polymerization reactor, heated to 290° C. to carry out a polycondensation reaction in a highly vacuum of 27 Pa or less, resulting in polyethylene-2,6-naphthalene dicarboxylate having an intrinsic viscosity of 0.61 dl/g and containing substantially no particles.

Pellets of the polyethylene-2,6-naphthalene dicarboxylate was dried at 170° C. for 6 hours, fed to an extruder hopper, melted at a melting temperature of 305° C., filtered through a stainless thin-wire filter having an average mesh of 17 μm, extruded via die slits of 3 mm onto a rotary cooling drum having a surface temperature of 60° C. and quenched to obtain a not-yet stretched film. The film thus obtained was pre-heated at 120° C., and stretched by 3.1-fold between low speed and high speed rollers longitudinally while being heated by an IR heater at 900° C. from the position 15 mm above the film. One side surface of the longitudinally stretched film was coated with coating liquid 1 in a dried thickness of 0.1 μm by a roll coater. Then the film was fed to a tenter and was stretched crosswise by 3.2-fold at 145° C. The obtained biaxially oriented film was heat-fixed at 240° C. for 40 seconds to produce a laminated polyester film having a 200 μm thickness. Properties of the obtained film are shown in Table 2 below. The obtained thin film had improved shock resistance, and improved lubricity, transparency, dimensional stability and adhesion.

Example 2

After the laminated polyester film obtained in Example 1 was wound into a roll, the film was provided with a relaxing treatment with a relaxing ratio of 0.5%, at 220° C. in a heating zone by an IR heater, to obtain a biaxially oriented film. Properties of the obtained film are shown in Table 2 below. The obtained thin film had improved shock resistance, and improved lubricity, transparency, dimensional stability and adhesion. Specifically, it has particularly improved dimensional stability.

TABLE 2

| | | | | Ex. 1 | Ex. 2 |
|---|---|---|---|---|---|
| Film-producing conditions | Thickness | | μm | 200 | |
| | Stretch ratio (lengthwise × crosswise) | | -fold | 3.1 × 3.2 | |
| Evaluation items | Haze | | % | 1.0 | 1.0 |
| | Total light transmittance | | % | 87 | 87 |
| | Center line surface roughness | SRa | nm | 11 | 11 |
| | Ten points average roughness | Rz | nm | 100 | 100 |
| | Thermal shrinkage (230° C. × 30 minutes) | MD direction | % | 3.0 | 0.5 |
| | | TD direction | % | 4.0 | 0.5 |
| | Index of the difference in refractive indexes | Δn | | −1 | 3 |
| | Young's modulus | MD direction | GPa | 5.8 | 5.6 |
| | | TD direction | GPa | 5.8 | 5.6 |
| | Lubricity | | | ◯ | ◯ |
| | Hard coat layer adhesion | | | ◯ | ◯ |
| | 50% destructing energy ($E_{50}$) | | J | 0.6 | 0.6 |
| | General evaluation | | | ◯ | ◎ |

Comparative Example 1

The polyethylene-2,6-naphthalene carboxylate used in Example 1 was mixed with 0.1 w/t % of globular silica particles having an average particle size of 0.35 μm. The resultant mixture was stretched longitudinally by 3.7-fold and crosswise by 4.0-fold, and a biaxially stretched film was obtained by a procedure same as that of Example 1 except that the obtained film had a thickness of 75 μm. Properties of the obtained film are shown in Table 3. Because the obtained film contains lubricant, the film is opaque having a high haze value and a degraded total light transmittance. Further, because the film has a high stretch ratio, it has a high thermal shrinkage ratio.

Comparative Example 2

Coating liquid 1 in Example 1 was replaced by coating liquid 2 and the procedure of Example 1 was repeated to obtain a biaxially stretched film. Properties of the obtained film are shown in Table 3. Because there is a great difference in the refractive indexes of inert particles and polymer weight binder of the coating layer, the obtained film is opaque having a high haze value.

Comparative Example 3

Coating liquid 1 in Example 1 was replaced by coating liquid 3 and the procedure of Example 1 was repeated to obtain a biaxially stretched film. Properties of the obtained film are shown in Table 3. Because the coating layer contains no inert particles, the obtained film lacks lubricity.

TABLE 3

| | | | *Comp. Ex. 1 | *Comp. Ex. 2 | *Comp. Ex. 3 |
|---|---|---|---|---|---|
| Film-producing conditions | Thickness | μm | 75 | 200 | |
| | Stretch ratio (lengthwise × crosswise) | -fold | 3.7 × 4.0 | 3.1 × 3.2 | |
| Evaluation items | Haze | % | 21.0 | 1.7 | 0.8 |
| | Total light transmittance | % | 82 | 87 | 87 |
| | Center line surface roughness | SRa nm | 21 | 33 | 3 |
| | Ten points average roughness | Rz nm | 70 | 160 | 33 |
| | Thermal shrinkage (230° C. × 30 minutes) | MD direction % | 4.2 | 3.0 | 3.0 |
| | | TD direction % | 4.7 | 4.0 | 4.0 |
| | Index of the difference in refractive indexes | Δn | −16 | −1 | −1 |
| | Young's modulus | MD direction GPa | 6.1 | 5.8 | 5.8 |
| | | TD direction GPa | 6.4 | 5.8 | 5.8 |
| | Lubricity | | ○ | ○ | X |
| | Hard coat layer adhesion | | X | ○ | ○ |
| | 50% destructing energy ($E_{50}$) | J | 0.6 | 0.6 | 0.6 |
| General evaluation | | | X | X | X |

*Comp. Ex. = Comparative Example

Comparative Example 4

The procedure of Example 1 was repeated except that a coating layer was not provided and that the stretch ratio was changed as shown in Table 2, to obtain a biaxially stretched film. Properties of the obtained film are shown in Table 4. Because there was no coating layer, the film lacks lubricity, has reduced adhesion to a hardcoat layer, and has great anisotropy in the refractive index.

Comparative Example 5

96 parts of methyl terephthalate, 58 parts of ethylene glycol, 0.038 parts of manganese acetate and 0.041 parts of antimony trioxide were charged into a reactor and were heated to a temperature of 240° C. to carry out an ester exchange reaction while distilling methanol off. After completion of the ester exchange reaction, there was added 0.097 parts of trimethyl phosphate. Subsequently, the reaction product was heated finally to 280° C. to carry out a polycondensation reaction in a highly vacuum, resulting in chips of terephthalate having an intrinsic viscosity ([η]) of 0.64.

The chips of the polyethylene terephthalate was dried at 170° C. for 3 hours, fed to a two axle extruder, melted at a melting temperature of 208° C., and quenched for solidification to obtain master chips.

Pellets of the polyethylene terephthalate was dried at 160° C. for 3 hours, fed to a extruder hopper, melted at a melting temperature of 295° C., and quenched for solidification in a rotary cooling drum maintained at 20° C. to obtain a not-yet stretched film. The film thus obtained was stretched at 95° C. longitudinally by 3.5-fold. Subsequently, coating materials were applied to the lower surface and to the upper surface of the film in a dried thickness of 0.1 μm. Then the film was stretched crosswise by 3.8-fold at 110° C., followed by a heat treatment with a temperature of 230° C., to obtain a biaxially stretched film having a thickness of 100 μm. Properties of the obtained film are shown in Table 4. The obtained film has favorable haze and total light transmittance, but has a great thermal shrinkage ratio resulting in lacking dimensional stability.

Comparative Example 6

Commercially available polyether sulfone film (produced by Sumitomo Bakelite; trade name: FS-1300) having 200 μm thickness was evaluated. The result of the evaluation was shown in Table 4. The film had favorable haze, total light transmittance and thermal shrinkage, but lacks lubricity and shock resistance.

TABLE 4

| | | | *Comp. Ex. 4 | *Comp. Ex. 5 | *Comp. Ex. 6 |
|---|---|---|---|---|---|
| Film-producing conditions | Thickness | μm | 75 | 100 | 200 |
| | Stretch ratio (lengthwise × crosswise) | -fold | 4.0 × 3.3 | 3.5 × 3.8 | |
| Evaluation items | Haze | % | 0.7 | 0.8 | 0.7 |
| | Total light transmittance | % | 85 | 90 | 88 |
| | Center line surface roughness | SRa nm | 3 | 11 | 5 |
| | Ten points average roughness | Rz nm | 15 | 100 | 12 |
| | Thermal shrinkage (230° C. × 30 minutes) | MD direction % | 2.0 | 6.8 | 0.1 |
| | | TD direction % | 0.4 | 3.4 | 0.6 |
| | Index of the difference in refractive indexes | Δn | 65 | 12 | 1 |
| | Young's modulus | MD direction GPa | 6.7 | 5.1 | 2.3 |
| | | TD direction GPa | 5.7 | 5.7 | 2.3 |
| | Lubricity | | X | ○ | X |
| | Hardcoat layer adhesion | | X | ○ | ○ |
| | 50% destructing energy ($E_{50}$) | J | 0.6 | 0.4 | 0.2 |
| | General evaluation | | X | X | Δ |

*Comp. Ex. = Comparative Example

Example 3

A hard coat agent (produced by Dainichi Seika Kogyo KK; trade name: PETD-31) for forming a hardcoat layer was mixed with 1-hydroxycyclophenylketone, was degassed and was coated to the coating layer side of the film obtained in Example 1 by a roll coating method, in a dried thickness of 5 μm. After the hard coat layer was dried, electron beam of 175 kV and 10 Mrad was radiated to the layer to form a hardcoat coating film. Further, a depositing material comprising a mixture of Si and $SiO_2$ was deposited on the surface opposite to the surface the hardcoat layer was applied, by a vacuum deposition device to form a SiOx film having a 20 nm thickness.

Subsequently, a sputtering apparatus was used wherein an Ar—O2 mixed gas ($O_2$ concentration of 1.4 Vol. %) was introduced and the pressure was controlled to 0.27 Pa, to carry out a DC sputtering with ITO target ($SnO_2$ concentration of 5 wt %) at a power concentration of 1 W/cm² to form a coat of 130 nm. After being provided with a heat treatment of 150° C. for 2 hours, a laminated film having an ITO film was obtained. Properties of the obtained film are shown in Table 5. The film has a thin structure having an improved shock resistance.

Example 4

To the film obtained in Example 2 was laminated a hardcoat layer, a gas barrier layer and a transparent conductive layer by the method same as that of Example 3. Properties of the obtained film are shown in Table 5. The film has a thin structure having an improved shock resistance.

Comparative Example 7

To the film obtained in Comparative Example 6 was laminated a hardcoat layer, a gas barrier layer and a transparent conductive layer by the method same as that of Example 3. Properties of the obtained film are shown in Table 5. The film lacks shock resistance and is susceptible to fracture.

Comparative Example 8

Properties of a commercially available ITO filmed glass (produced by Corning; trademark: #1737) are shown in Table 5. The product had extremely inferior shock resistance.

TABLE 5

|  |  | Ex. 3 | Ex. 4 | Comp. Ex. 7 | Comp. Ex. 8 |
|---|---|---|---|---|---|
| 50% destructing energy ($E_{50}$) | J | 0.6 | 0.6 | 0.2 | 0.01 |

Ex. = Example,
Comp. Ex. = Comparative Example

According to the present invention, there is provided a laminated polyester film which is improved in lubricity, transparency, dimensional stability, shock resistance and adhesion.

What is claimed is:

1. A laminated polyester film comprising a polyester base film stretched to at least one direction, and a coating layer provided on at least one surface of the polyester base film, wherein said coating layer contains polymer binder and inert particles, wherein the difference in refractive index of the inert particles and the polymer binder is 0.04 or less, and wherein the laminated polyester film has a haze of 1.5% or less, a total light transmittance of 85% or more, a 50% destructing energy per 100 μm film thickness of 0.3 J or more, and a thermal shrinkage ratio at 230° C. for 30 minutes of 4% or less.

2. A laminated polyester film according to claim 1, wherein the polyester is polyethylene-2,6-naphthalene dicarboxylate.

3. A laminated polyester film according to claim 1, wherein the thermal shrinkage ratio at 230° C. for 30 minutes is 1% or less.

4. A laminated polyester film according to claim 1, wherein both the refractive index of the polymer binder and that of the inert particles are 1.50 to 1.60.

5. A laminated polyester film according to claim 1, wherein the polymer binder is a mixture of a polyester resin and an acrylic resin containing oxazoline groups and polyalkylene oxide groups.

6. A laminated polyester film according to claim 1, wherein the three-dimensional centerline average roughness SRa of both surfaces of the film is 2 to 20 nm, and the ten-point average roughness Rz of at least one of the surfaces is 50 to 150 nm.

7. A laminated polyester film according to claim 1, wherein the base film is produced by a continuous film-producing process, and wherein when the refractive index of the continuous film-production direction is set as nMD and that of the direction vertical to the continuous film-production direction is set as nTD, the absolute value of the index Δn of difference in refractive indexes of the film surface direction, represented by the following formula, is 50 or less:

$$\Delta n = (nMD - nTD) \times 1000.$$

8. A laminated polyester film according to claim 1, wherein the Young's modulus is 3 to 15 GPa.

9. A laminated polyester film, wherein a hardcoat layer is provided on the coating layer according to claim 1.

10. A laminated polyester film according to claim 9, wherein a gas barrier layer is provided on the hardcoat layer.

11. A laminated polyester film according to claim 10, wherein a transparent conductive layer is provided on the surface on which the gas barrier layer is provided.

12. A laminated polyester film according to claim 11, wherein a 50% destructing energy per 100 μm film thickness is 0.4 J or more.

13. An ELS comprising the laminated polyester film according to claim 12 as a substrate film.

14. An electronic paper comprising the laminated polyester film according to claim 12 as a substrate film.

15. A solar battery comprising the laminated polyester film according to claim 12 as a substrate film.

16. A laminated film according to claim 10, wherein a transparent conductive layer is provided on the surface opposite to that the gas barrier layer is provided.

17. An ELS comprising the laminated polyester film according to claim 1 as a substrate film.

18. An electronic paper comprising the laminated polyester film according to claim 1 as a substrate film.

19. A solar battery comprising the laminated polyester film according to claim 1 as a substrate film.

* * * * *